United States Patent [19]
Fujita et al.

[11] Patent Number: 5,936,937
[45] Date of Patent: Aug. 10, 1999

[54] MOBILE COMMUNICATION SYSTEM USING CDMA SITE DIVERSITY SYSTEM

[75] Inventors: Kousaku Fujita; Shoji Tanaka, both of Tokyo, Japan

[73] Assignee: NEC Corporation, Tokyo, Japan

[21] Appl. No.: 08/843,592

[22] Filed: Apr. 16, 1997

[30] Foreign Application Priority Data

Apr. 16, 1996 [JP] Japan .................................... 8-094234

[51] Int. Cl.$^6$ .................................................. G01R 31/08
[52] U.S. Cl. ....................... 370/216; 370/335; 370/342; 370/332; 371/37.02; 371/5.1; 375/200; 455/562; 455/101
[58] Field of Search .................................... 370/335, 342, 370/252, 332, 333, 216; 371/37.02, 5.1, 5.2, 6; 375/200, 347; 455/562, 101, 133, 134, 135, 272, 277.1, 277.2

[56] References Cited

U.S. PATENT DOCUMENTS

| | | | |
|---|---|---|---|
| 5,754,586 | 5/1998 | Carsello | 371/5.1 |
| 5,777,307 | 7/1998 | Yamazaki | 235/454 |
| 5,778,010 | 7/1998 | Hatta | 371/37.02 |
| 5,812,541 | 9/1998 | Fuentes et al. | 370/335 |
| 5,815,507 | 9/1998 | Vinggaard et al. | 371/5.1 |

FOREIGN PATENT DOCUMENTS 51-36004  3/1976  Japan .
54-131811  10/1979  Japan .

Primary Examiner—Jeffery A. Hofsass
Assistant Examiner—Daniel Previl
Attorney, Agent, or Firm—Foley & Lardner

[57] ABSTRACT

A mobile communication system comprises a mobile station for transmitting packet data. A number of base stations receive the packet data and produce received packet data, respectively. A mobile exchange simultaneously receives a number of received packet data from the base stations and comprises a data quality decision unit for deciding quality of each received packet data to produce a decision result. The data quality decision unit produces an error detection signal when all the received packet data have the frame error. A data selecting unit selects one received packet data having the best quality of these received packet data according to the decision result and produces it as selected packet data. A packet data reproducing unit carries out a predetermined data reproduction operation to reproduce packet data out of a number of the received packet data and supplies it to the data selecting unit as reproduced packet data. A frame error detecting unit detects whether there is a frame error in the reproduced packet data and supplies, upon detection of the frame error, to the data processing unit a frame error detection signal indicating that there is the frame error in the reproduced packet data. The data selecting unit produces the reproduced packet data as the selected packet data in response to the error detection signal.

9 Claims, 4 Drawing Sheets

|  | 1st BIT | 2nd BIT | 3rd BIT | 4th BIT | RECEPTION ELECTRIC FIELD STRENGTH |
|---|---|---|---|---|---|
| 1st BASE STATION 11-1 | 1 | 0 | 0 | 1 | 7 dB |
| 2nd BASE STATION 11-2 | 1 | 1 | 0 | 0 | 5 dB |
| 3rd BASE STATION 11-3 | 0 | 1 | 1 | 0 | 3 dB |
| 4th BASE STATION 11-4 | 1 | 1 | 1 | 1 | 2 dB |

| 1 | 1 | 0 | 0 |
|---|---|---|---|

FIG. 3

| | 1st BIT | 2nd BIT | 3rd BIT | 4th BIT | RECEPTION ELECTRIC FIELD STRENGTH | WEIGHTING FACTOR |
|---|---|---|---|---|---|---|
| 1st BASE STATION | 1 | 0 | 0 | 1 | 7dB | 0.41 =7/(7+5+3+2) |
| 2nd BASE STATION | 1 | 1 | 0 | 0 | 5dB | 0.29 =5/(7+5+3+2) |
| 3rd BASE STATION | 0 | 1 | 1 | 0 | 3dB | 0.18 =3/(7+5+3+2) |
| 4th BASE STATION | 1 | 1 | 1 | 1 | 2dB | 0.12 =2/(7+5+3+2) |
| | 1 | 1 | 0 | 1 | | |

FIG. 4

MOBILE COMMUNICATION SYSTEM USING CDMA SITE DIVERSITY SYSTEM

BACKGROUND OF THE INVENTION

The present invention relates to a mobile communication system using a code divisional multiple access (CDMA) site diversity system in which a mobile station makes simultaneous communication through two or more base stations.

A conventional mobile communication system of the type described comprises a mobile station, a number of base stations, and a mobile exchange. The mobile station transmits packet data during communication. The packet data are received by the individual base stations. Each base station receives the packet data and sends it to the mobile exchange as received packet data.

The mobile exchange comprises a data quality decision unit, a data selecting unit, and a data processing unit. The data quality decision unit and the data selecting unit receive a number of received packet data simultaneously from a number of base stations. The data quality decision unit compares these received packet data for quality in response to the reception of them from the base stations. The data quality decision unit then supplies a comparison result to the data selecting unit and the data processing unit. The data selecting unit selects one received packet data having the best quality of these received packet data according to the comparison result. The data selecting unit then supplies it as selected packet data to the data processing unit. The data processing unit carries out a predetermined code conversion operation to convert the selected packet data and produces it as converted packet data.

A number of the received packet data received simultaneously by the two or more base stations may all be bad in quality in such mobile communication system. This means that all the received packet data have a frame error or errors. The data quality decision unit thus supplies an error detection signal to the data selecting unit and the data processing unit, indicating that all the received packet data have the frame error. In response to the error detection signal, the data selecting unit rejects or turns down all the received packet data transmitted from the base stations. No selected packet data is thus produced from the data selecting unit. In this case, the data processing unit carries out processing to complement the selected packet data in response to the error detection signal. This processing is achieved by means of carrying out a predetermined code conversion operation using the selected packet data previously received and producing it as the converted packet data. Alternatively, this processing may be achieved by means of carrying out a predetermined code conversion operation using packet data to be recognized as silent or background noise data and producing it as the converted packet data. In such a case, the communication may be broken instantaneously or be suffered from a short-time noise, with a detrimental effect on the quality of the communication.

SUMMARY OF THE INVENTION

Therefore, an object of the present invention is to provide a mobile communication system in which quality of communication is not deteriorated even when a frame error is detected in all of received packet data simultaneously supplied from a mobile station to two or more base stations.

The present invention is a mobile communication system using a CDMA site diversity system, comprising a mobile station for use in transmitting packet data containing first through n-th bits where n represents a natural number not smaller than 2; a number of base stations each of which receives the packet data and produces received packet data; and a mobile exchange which receives a number of received packet data from the base stations, in which the mobile station uses a CDMA site diversity system to make simultaneous communication through the base stations.

According to an aspect of the present invention, the mobile exchange comprises a data quality decision unit which decides, in response to the reception of a number of received packet data, quality of each received packet data to produce a decision result. The data quality decision unit produces an error detection signal indicating that all the received packet data have a frame error or errors when all the received packet data have the frame error or errors. The mobile exchange further comprises a data selecting unit which selects, in response to a number of the received packet data and the decision result, one received packet data having the best quality of these received packet data according to the decision result to produce it as selected packet data; a data processing unit which carries out, in response to the selected packet data, a predetermined code conversion operation to convert the selected packet data and produces a converted packet data; a packet data reproducing unit which carries out, in response to a number of the received packet data, a predetermined data reproduction operation to reproduce packet data out of a number of the received packet data and supplies it to the data selecting unit as reproduced packet data; and a frame error detecting unit which detects, in response to the reproduced packet data, whether there is a frame error in the reproduced packet data and supplies, upon detection of the frame error, to the data processing unit a frame error detection signal indicating that there is the frame error in the reproduced packet data. The data selecting unit produces the reproduced packet data as the selected packet data in response to the error detection signal.

BRIEF DESCRIPTION OF THE DRAWINGS

FIG. 3 is a view for use in describing a first exemplified operation of data reproduction processing carried out by a packet data reproducing unit in a mobile exchange shown in FIG. 2; and FIG. 4 is a view for use in describing a second exemplified operation of data reproduction processing carried out by the packet data reproducing unit in the mobile exchange shown in FIG. 2.

DESCRIPTION OF THE PREFERRED EMBODIMENTS

Figure 1:
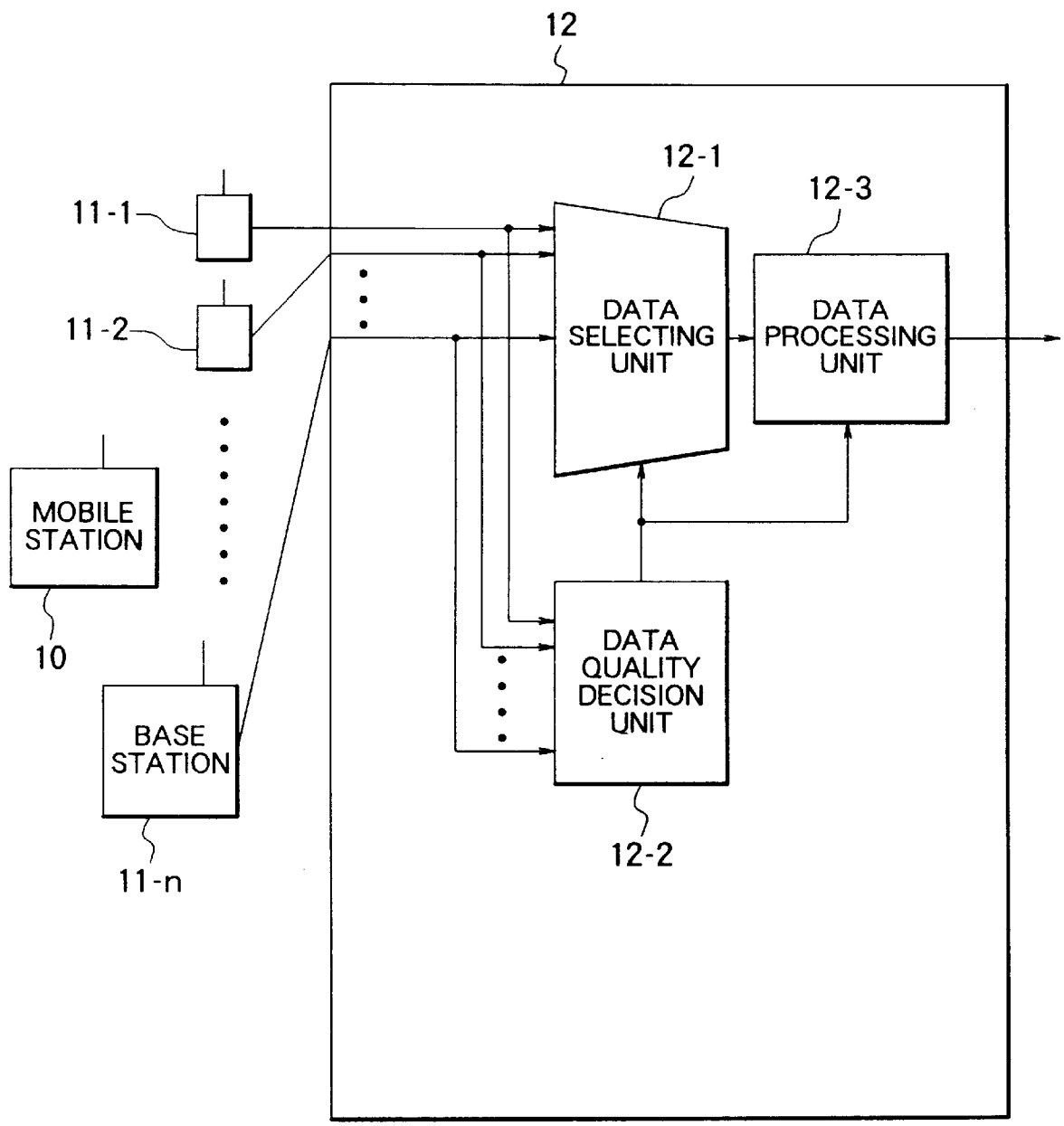
FIG. 1 is a block diagram showing a configuration of a conventional mobile communication system using a CDMA site diversity system.

Referring to FIG. 1, a conventional mobile communication system using a CDMA site diversity system is described for the purpose of facilitating better understanding of the present invention. A mobile communication system comprises a mobile station 10, first through n-th base stations 11-1 through 11-n where n represents a natural number not smaller than 2, and a mobile exchange 12. The mobile exchange 12 comprises a data selecting unit 12-1, a data quality decision unit 12-2, and a data processing unit 12-3.

The mobile station 10 makes simultaneous communication via the first through the n-th base stations 11-1 through 11-n. During this communication, the mobile station 10 transmits packet data by radio to the first through the n-th base stations 11-1 through 11-n. The packet data are received by the first through the n-th base stations 11-1 through 11-n as received packet data. Each of the first through the n-th base stations 11-1 through 11-n supplies the received packet data to the data selecting unit 12-1 and the data quality decision unit 12-2. The data quality decision unit 12-2 compares for quality these received packet data supplied from the first through the n-th base stations 11-1 through 11-n, and transmits a comparison result to the data selecting unit 12-1 and the data processing unit 12-3.

The data selecting unit 12-1 selects one received packet data having the best quality of these received packet data supplied from the first through the n-th base stations 11-1 through 11-n, in accordance with the comparison result and supplies it as selected packet data to the data processing unit 12-3. The data processing unit 12-3 carries out a predetermined code conversion operation of the selected packet data to produce it as converted packet data.

A number of the received packet data received simultaneously by the first through the n-th base stations 11-1 through 11-n may all be bad in quality in such mobile communication system. This means that all the received packet data have a frame error or errors. The data quality decision unit 12-2 thus supplies an error detection signal to the data selecting unit 12-1 and the data processing unit 12-3, indicating that all the received packet data have the frame error. In response to the error detection signal, the data selecting unit 12-1 rejects or turns down all the received packet data transmitted from the first through the n-th base stations 11-1 through 11-n. No selected packet data are thus produced from the data selecting unit 12-1. In this event, the data processing unit 12-3 carries out processing to complement the selected packet data in response to the error detection signal. This processing is achieved by means of carrying out a predetermined code conversion operation using the selected packet data previously received and producing it as the converted packet data. Alternatively, this processing may be achieved by means of carrying out a predetermined code conversion operation using packet data to be recognized as silent or background noise data and producing it as the converted packet data. In such a case, the communication may be broken instantaneously or be suffered from a short-time noise, with a detrimental effect on the quality of the communication.

Figure 2:
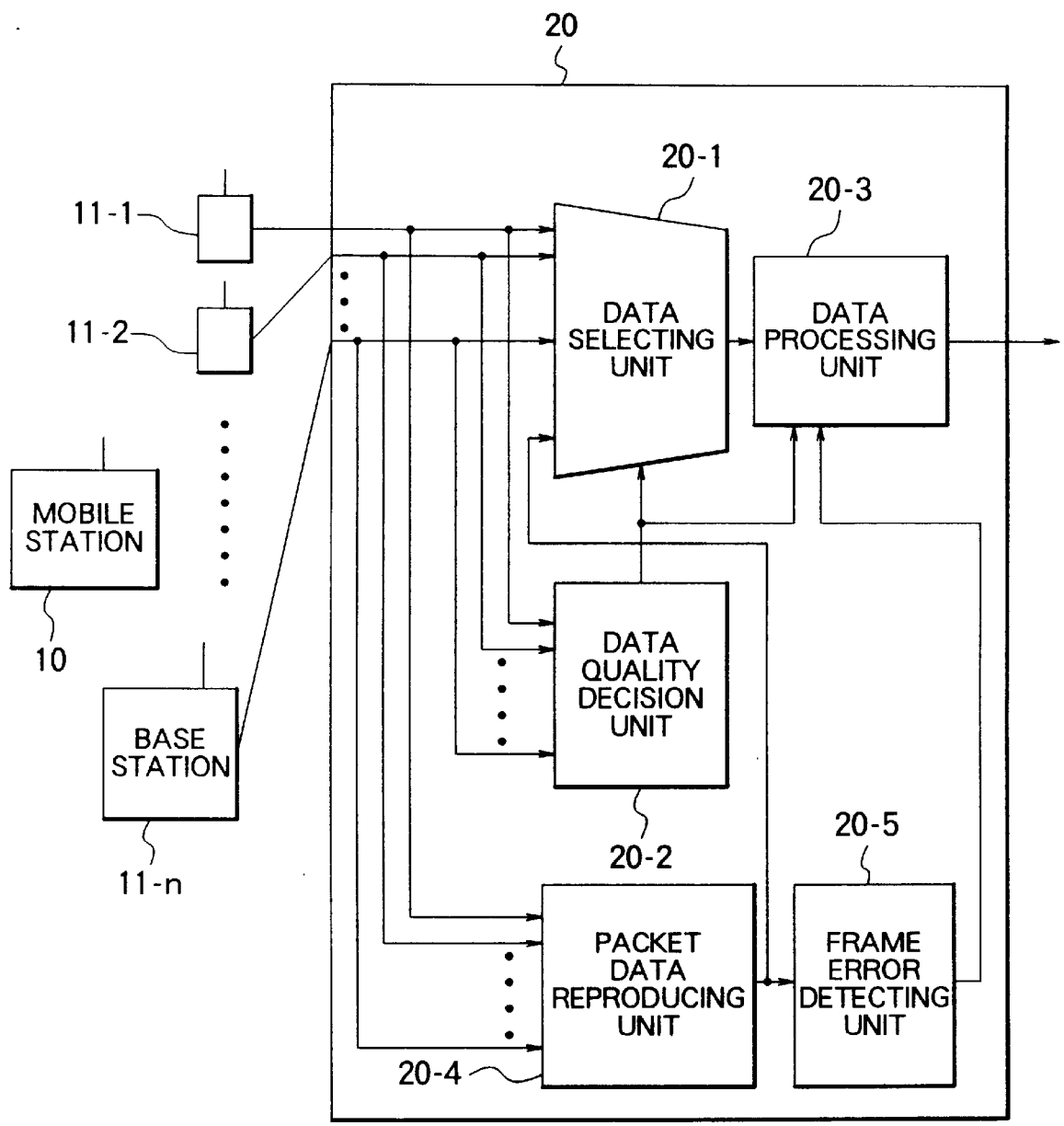
FIG. 2 is a block diagram of a mobile communication system using a CDMA site diversity system according to a preferred embodiment of the present invention.

Referring to FIGS. 2 and 3, description will be made with respect to a mobile communication system using a CDMA site diversity system according to an embodiment of the present invention. In FIG. 2, the mobile communication system comprises a mobile exchange 20 in place of the mobile exchange 12 described in conjunction with FIG. 1. The mobile exchange 20 comprises a data selecting unit 20-1, a data quality decision unit 20-2, a data processing unit 20-3, a packet data reproducing unit 20-4, and a frame error detecting unit 20-5. As described later, the packet data reproducing unit 20-4 receives a number of the received packet data received by the first through the n-th base stations 11-1 through 11-n and reproduces the packet data by means of majority determination in bit on these received packet data to produce it as reproduced packet data to the data selecting unit 20-1 and the frame error detecting unit 20-5.

It is assumed in this embodiment that the mobile exchange 20 makes simultaneous communication with the mobile station 10 via the first through the n-th base stations 11-1 through 11-n. As described in conjunction with FIG. 1, the data quality decision unit 20-2 compares for quality the first through the n-th received packet data received simultaneously from the first through the n-th base stations 11-1 through 11-n and detects whether there is a frame error. The data quality decision unit 20-2 supplies a comparison or a decision result and a detection result to the data selecting unit 20-1 and the data processing unit 20-3. The data selecting unit 20-1 selects one received packet data having the best quality of the first through the n-th received packet data according to the comparison result supplied from the data quality decision unit 20-2 and supplies it to the data processing unit 20-3 as selected packet data.

The first through the n-th received packet data may all be bad in quality in such mobile communication system. This means that all the first through the n-th received packet data have the frame error. The data quality decision unit 20-2 thus supplies an error detection signal, indicating that all the first through the n-th received packet data have the frame error. In response to the error detection signal, the data selecting unit 20-1 rejects or turns down all the first through the n-th received packet data supplied from the first through the n-th base stations 11-1 through 11-n. Instead, the data selecting unit 20-1 selects the reproduced packet data supplied from the packet data reproducing unit 20-4 and supplies this reproduced packet data to the data processing unit 20-3 as the selected packet data. The data processing unit 20-3 carries out code conversion operation of the selected packet data supplied from the data selecting unit 20-1 and produces it as the converted packet data.

The frame error detecting unit 20-5 detects whether there is a frame error in the reproduced packet data supplied from the packet data reproducing unit 20-4. The frame error detecting unit 20-5 supplies a frame error detection signal to the data processing unit 20-3 when there is any frame error.

The data processing unit 20-3 carries out either one of the following first to third operations depending on the error detection signal supplied from the data quality decision unit 20-2 and the frame error detection signal supplied from the frame error detecting unit 20-5.

The first operation is carried out when the data processing unit 20-3 receives the error detection signal from the data quality decision unit 20-2 and no frame error detection signal from the frame error detecting unit 20-5. In such a case, the data processing unit 20-3 carries out the code conversion operation of the selected packet data supplied from the data selecting unit 20-1 (as provided to it by the packet data reproducing unit 20-4), and produces it as the converted packet data.

The second operation is carried out when the data processing unit 20-3 receives the error detection signal from the data quality decision unit 20-2 and the frame error detection signal from the frame error detecting unit 20-5. In such a case, the data processing unit 20-3 carries out the code conversion operation of the selected packet data that is received immediately before the last reception and that has no frame error, without using the selected packet data supplied from the data selecting unit 20-1. The data processing unit 20-3 thus has a function of storing the several most recent selected packet data.

The third operation is carried out when the data processing unit 20-3 receives no error detection signal from the data quality decision unit 20-2. In such a case, the data processing unit 20-3 carries out the code conversion operation of the selected packet data supplied from the data selecting unit 20-1 regardless of the presence of the frame error detection signal which may have been supplied from the frame error detecting unit 20-5. The data processing unit 20-3 produces it as the converted packet data.

Referring also with FIG. 3, description is given of a first example of a packet data reproduction operation carried out by the packet data reproducing unit 20-4. In this first example, the packet data reproducing unit 20-4 reproduces the packet data by way of a majority determination in bit on these first through the n-th received packet data. It is assumed in this first example that the mobile station 10 makes the simultaneous communication via the first through fourth base stations 11-1 through 11-4. It is also assumed that the first through the fourth base stations 11-1 through 11-4 produce first through fourth received packet data, respectively, each of which consists of four bits as shown in first through fourth lines in FIG. 3.

The first through the fourth received packet data are each a part of the packet data transmitted by the mobile station 10. In FIG. 3, values of reception electric field strength are indicated on the right side of the first through the fourth received packet data. The value of the reception electric field strength is a measurement on an electric field strength of a received signal obtained upon reception of the packet data at the first through the fourth base stations 11-1 through 11-4 from the mobile station 10. The measurement is transmitted from the base station along with the received packet data. The values of the reception electric field strength in the first example are 7 (dB), 5 (dB), 3 (dB), and 2 (dB) at the first through the fourth base stations 11-1 through 11-4, respectively. The fourth base station 11-4 has the smallest value of the reception electric field strength. Illustrated at a bottom line of FIG. 3 is a reproduced packet data obtained as a result of the majority determination.

Considering the example illustrated in FIG. 3, the packet data reproducing unit 20-4 rejects the fourth received packet data having the smallest value of the reception electric field strength out of the first through the fourth received packet data. The received packet data having the smallest value of the reception electric field strength is rejected for the following reason. The number of the received packet data is even when the number of the base stations is even. An even number of the received packet data may make the majority determination impossible. The rejection of the received packet data having the smallest value of the reception electric field strength provides an odd number of the received packet data, allowing the majority determination.

In the example illustrated in FIG. 3, the packet data are reproduced out of the first through the third received packet data by means of the majority determination. Logical values of the first bit of the first through the third received packet data are "1", "1", and "0", respectively. The packet data reproducing unit 20-4 takes the logical value of "1" as a result of the majority determination. Logical values of the second bit of the first through the third received packet data are "0", "1", and "1", respectively. The packet data reproducing unit 20-4 takes the logical value of "1" as a result of the majority determination. For the third bit of the first through the third received packet data, the majority determination is made among the logical values of "0", "0", and "1", which results in the selection of the logical value of "0". Likewise, the logical value of "0" is selected for the fourth bit of the first through the third received packet data. The packet data reproducing unit 20-4 thus produces, as the reproduced packet data, the packet data formed of the logical values "1", "1", "0", and "0" out of the first through the third received packet data.

Referring to FIG. 4, description is given of a second example of a packet data reproduction operation carried out by the packet data reproducing unit 20-4. In this second example, the packet data reproducing unit 20-4 reproduces the packet data by way of weighting of a number of the received packet data depending on the value of the received electric field strength.

It is assumed in this second example that the mobile station 10 makes the simultaneous communication via the first through the fourth base stations 11-1 through 11-4. It is also assumed that the first through the fourth base stations 11-1 through 11-4 produce the first through the fourth received packet data, respectively, each of which consists of four bits as shown in first through fourth lines in FIG. 4.

The first through the fourth received packet data are each a part of the packet data transmitted from the mobile station 10. In FIG. 4, values of reception electric field strength are indicated on the right side of the first through the fourth received packet data. The value of the reception electric field strength is a measurement on an electric field strength of a received signal obtained upon reception of the packet data at the first through the fourth base stations 11-1 through 11-4 from the mobile station 10. The values of the reception electric field strength in the second example are 7 (dB), 5 (dB), 3 (dB), and 2 (dB) at the first through the fourth base stations 11-1 through 11-4, respectively. In FIG. 4, a weighting factor is indicated on the right side of the value of the reception electric field strength. Illustrated at a bottom line of FIG. 4 is a reproduced packet data obtained as a result of the weighting operation.

The packet data reproducing unit 20-4 calculates the weighting factor for each of the first through the fourth base stations 11-1 through 11-4 according to the reception electric field strength obtained at the first through the fourth base stations 11-1 through 11-4.

In the example illustrated in FIG. 4, a first weighting factor for the first base station 11-1 is as follows: 0.41 $\{=7/(7+5+3+2)\}$. A second weighting factor for the second base station 11-2 is 0.29 $\{=5/(7+5+3+2)\}$. Likewise, a third weighting factor for the third base station 11-3 is 0.18 $\{=3/(7+5+3+2)\}$ and a fourth weighting factor for the fourth base station 11-4 is 0.12 $\{=2/(7+5+3+2)\}$.

The packet data reproducing unit 20-4 multiplies the logical values of the first bit of the first through the fourth received packet data by the first through the fourth weighting factors, respectively, and sums solutions of the multiplication. This provides 0.82 as the calculation result. Next, the packet data reproducing unit 20-4 multiplies the logical values of the second bit of the first through the fourth received packet data by the first through the fourth weighting factors, respectively, and sums solutions of the multiplication. This provides 0.59 as the calculation result. Likewise, the packet data reproducing unit 20-4 multiplies the logical values of the third bit of the first through the fourth received packet data by the first through the fourth weighting factors, respectively, and sums solutions of the multiplication. This provides 0.30 as the calculation result. The packet data reproducing unit 20-4 multiplies the logical values of the fourth bit of the first through the fourth received packet data by the first through the fourth weighting factors, respectively, and sums solutions of the multiplication. This provides 0.53 as the calculation result. These calculations are explained as follows:

First bit: 1×0.41+1×0.29+0×0.18+1×0.12=0.82≧0.5
Second bit: 0×0.41+1×0.29+1×0.18+1×0.12=0.59≧0.5
Third bit: 0×0.41+0×0.29+1×0.18+1×0.12=0.30<0.5
Fourth bit: 1×0.41+0×0.29+0×0.18+1×0.12=0.53≧0.5

The logical value of "1" is taken for a bit when the calculation result obtained in the manner described above is equal to or larger than 0.5, while the logical value of "0" is taken for a bit when the calculation result is smaller than 0.5. The packet data reproducing unit 20-4 then produces, as the reproduced packet data, the packet data having the logical values "1", "1", "0", and "1" out of the first through the fourth received packet data. It is possible in this second example to reproduce the packet data by using the same operation for both the even and odd number of the base stations under the simultaneous communication.

What is claimed is:

1. A mobile communication system using a CDMA site diversity system, comprising:

a mobile station for use in transmitting packet data containing first through n-th bits, where n represents a natural number not smaller than 2;

a plurality of base stations each of which receives the packet data and produces received packet data; and a mobile exchange which receives a plurality of said received packet data from said plurality of base stations, respectively, said mobile station using a CDMA site diversity system to make simultaneous communication through said plurality of base stations, said mobile exchange comprising:

a data quality decision unit which decides, in response to the reception of said plurality of said received packet data, quality of each received packet data to produce a decision result, said data quality decision unit producing an error detection signal indicating that all of said received packet data have a frame error or errors when all of said received packet data have the frame error or errors;

a data selecting unit which selects, in response to said plurality of said received packet data and the decision result, one received packet data having a best quality of said plurality of said received packet data according to the decision result to produce said one received packet data as selected packet data;

a data processing unit which carries out, in response to the selected packet data, a predetermined code conversion operation to convert the selected packet data into converted packet data;

a packet data reproducing unit which carries out, in response to said plurality of said received packet data, a predetermined data reproduction operation to reproduce packet data out of said plurality of said received packet data and supplies reproduced packet data to said data selecting unit; and a frame error detecting unit which detects, in response to the reproduced packet data, whether there is a frame error in the reproduced packet data and supplies, upon detection of the frame error, to said data processing unit a frame error detection signal indicating that there is the frame error in the reproduced packet data, wherein said data selecting unit produces the reproduced packet data as the selected packet data in response to the error detection signal.

2. A mobile communication system as claimed in claim 1, wherein said data processing unit converts the selected packet data that are received immediately before a last reception, without using the selected packet data, when said data processing unit receives the error detection signal from said data quality decision unit and the frame error detection signal from said frame error detecting unit.

3. A mobile communication system as claimed in claim 2, wherein said packet data reproducing unit carries out majority determination for each of the first through the n-th bits of said plurality of said received packet data.

4. A mobile communication system as claimed in claim 3, wherein, when the natural number n is an even number, said number of base stations each measures a reception electric field strength of the received packet data to produce a signal indicative of the measured reception electric field strength along with the received packet data, said packet data reproducing unit rejects the received packet data supplied from the base station having a smallest reception electric field strength out of said plurality of said received packet data and carries out the majority determination for each of the first through the n-th bits of remaining ones of said plurality of said received packet data.

5. A mobile communication system as claimed in claim 2, wherein said plurality of base stations each measures a reception electric field strength of the corresponding received packet data to produce a signal indicative of the measured reception electric field strength along with the received packet data, said packet data reproducing unit carries out a predetermined calculation by using a plurality of the reception electric field strength respectively measured at said plurality of base stations to obtain a plurality of weighting factors for said plurality of base stations, respectively, and processes said plurality of the received packet data according to the weighting factors to reproduce the reproduced packet data.

6. A mobile communication system as claimed in claim 1, wherein each of said plurality of base stations are cellular base stations, and wherein said plurality of base stations are configured to receive the packet data from said mobile station at all times during a communication by said mobile station.

7. A mobile communication system as claimed in claim 1, wherein said data selecting unit is configured to select the selected data packet at all times during a communication by said mobile station.

8. A mobile communication method for a CDMA site diversity system, comprising:

a) transmitting, by a mobile station in the CDMA site diversity system, packet data each containing first through n-th bits, where n is a natural number greater than 1;

b) receiving, by each of a plurality base stations, the packet data and producing received packet data as a result;

c) receiving, by a mobile exchange communicatively connected to the plurality of base stations, a plurality of said received packet data respectively produced by said plurality of base stations;

d) deciding, by the mobile exchange, in response to the reception of the plurality of said received packet data, a quality value of each received packet data to produce a decision result;

e) producing, by the mobile exchange, an error detection signal indicating that all of said received packet data have at least one frame error when all of said received packet data have at least one frame error;

f) selecting, by the mobile exchange, in response to the plurality of said received packet data and the decision result, one received packet data having a best quality of the plurality of said received packet data according to the decision result to produce said received packet data as selected packet data;

g) carrying out, by the mobile exchange in response to the selected packet data, a code conversion operation to convert the selected packet data into converted packet data;

h) carrying out, by the mobile exchange in response to the plurality of said received packet data, a data reproduction operation to reproduce packet data out of the plurality of said received packet;

i) detecting, by the mobile exchange in response to the reproduced packet data, whether there is a frame error in the reproduced packet data;

j) supplying, by the mobile exchange upon detection of the frame error, a frame error detection signal indicating that there is the frame error in the reproduced packet data, and k) producing, by the mobile exchange, the reproduced packet data as the selected packet data when the error detection signal has been produced.

9. A method claimed in claim 8, wherein the data reproduction operation is a bit-by-bit majority determination made from the plurality of said received packet data for each of the first through the n-th bits.

* * * * *